No. 750,622. PATENTED JAN. 26, 1904.
J. ECKSTORM.
COLLAR BUTTON.
APPLICATION FILED FEB. 18, 1903.

NO MODEL.

WITNESSES:
Harry L. Amer.
Arthur D. Lawson.

INVENTOR
John Eckstorm.
BY Victor J. Evans
Attorney

No. 750,622. Patented January 26, 1904.

UNITED STATES PATENT OFFICE.

JOHN ECKSTORM, OF BALTIMORE, MARYLAND.

COLLAR-BUTTON.

SPECIFICATION forming part of Letters Patent No. 750,622, dated January 26, 1904.

Application filed February 18, 1903. Serial No. 143,919. (No model.)

*To all whom it may concern:*

Be it known that I, JOHN ECKSTORM, a citizen of the United States, residing at Baltimore, in the State of Maryland, have invented new and useful Improvements in Collar-Buttons, of which the following is a specification.

My invention relates to new and useful Improvements in collar-buttons; and its object is to provide a simple and inexpensive device which is especially adapted for securing the ends of a collar to the collar-band of a shirt when the collar is too small to permit the ends thereof to overlap a sufficient distance to admit of the insertion of an ordinary collar-button into the buttonholes.

The invention consists in providing a base upon which is arranged a centrally-disposed shank having an L-shaped extension projecting laterally from the end thereof. A knob is arranged on this extension, so as to prevent the same from slipping out of position within a buttonhole.

The invention also consists in the further novel construction, combination, and arrangement of the several parts, which will be more fully hereinafter described and claimed, and illustrated in the accompanying drawings, in which—

Figure 1:
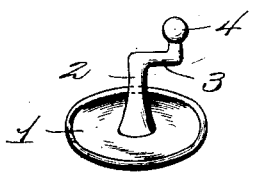
Figure 2:
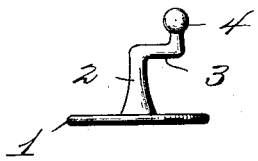
Figure 3:
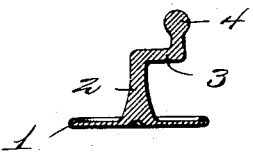
Figure 5:
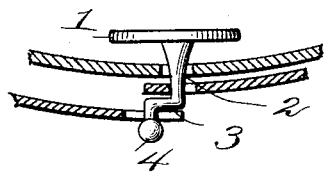
Figure 4:
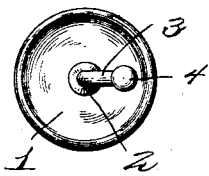

Figure 1 is a perspective view of my improved collar-button. Fig. 2 is a side elevation thereof. Fig. 3 is a section therethrough, and Fig. 4 is a plan view. Fig. 5 is a longitudinal section through a collar secured in position by means of my improved collar-button.

Referring to the figures by numerals of reference, 1 is a base-disk constructed in any suitable manner and has a shank 2 upon the center thereof, the sides of which are preferably slightly concaved longitudinally, and from the outer end of this shank projects a laterally-extending L-shaped arm 3, having a knob 4 at the free end thereof.

In using this improved collar-button the same is placed within the collar-band of a shirt as ordinarily, and the knob 4 is then inserted in the buttonhole at one end of a collar. The button is then turned so as to permit the end of the collar to slip over the L-shaped extension and onto shank 2. As the sides of this shank are concaved longitudinally, the collar will not easily slip therefrom. The knob 4 is then brought into position under the buttonhole in the other end of the collar and is inserted therethrough. This end of the collar is held in position upon the end of arm 3 by the knob 4, and it is unnecessary, therefore, to draw the two ends of the collar together so as to overlap. It will thus be seen that the device is especially adapted to be used upon collars which are too small to extend completely around the collar-band of the shirt.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus described the invention, what is claimed as new is—

A button comprising a base, a centrally-arranged shank extending therefrom, an L-shaped arm extending laterally from the outer end of the shank, and a knob concentrically arranged upon the free end of said arm and out of alinement with the shank.

In testimony whereof I affix my signature in presence of two witnesses.

JOHN ECKSTORM.

Witnesses:
THOS. KENT BRADFORD,
AUG. W. BRADFORD.